(12) United States Patent
Dikshit et al.

(10) Patent No.: US 12,095,642 B2
(45) Date of Patent: Sep. 17, 2024

(54) REMOTE REACHABILITY CHECKS IN A DISTRIBUTED TUNNEL FABRIC

(71) Applicant: Hewlett Packard Enterprise Development LP, Houston, TX (US)

(72) Inventors: Saumya Dikshit, Bangalore (IN); Srinath K. Rao, Roseville, CA (US); Santosh Sudam Easale, San Jose, CA (US); Ashwini Dahiya, Noida (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/872,754

(22) Filed: Jul. 25, 2022

(65) Prior Publication Data

US 2024/0031266 A1    Jan. 25, 2024

(51) Int. Cl.
*H04L 43/10*    (2022.01)
*H04L 12/46*    (2006.01)

(52) U.S. Cl.
CPC .......... *H04L 43/10* (2013.01); *H04L 12/4633* (2013.01); *H04L 12/4641* (2013.01)

(58) Field of Classification Search
None
See application file for complete search history.

(56) References Cited

U.S. PATENT DOCUMENTS

| | | | | |
|---|---|---|---|---|
| 9,614,906 B1 * | 4/2017 | Hegde | ................. | H04L 41/0668 |
| 2013/0148489 A1 * | 6/2013 | Boutros | ................... | H04L 47/10 |
| | | | | 370/216 |
| 2019/0158393 A1 * | 5/2019 | Nainar | ................... | H04L 45/00 |
| 2021/0250270 A1 * | 8/2021 | Arora | ...................... | H04L 45/50 |

(Continued)

FOREIGN PATENT DOCUMENTS

| | | | | |
|---|---|---|---|---|
| CN | 102598566 A | * | 7/2012 | .......... H04J 14/0257 |
| CN | 104426777 B | * | 7/2018 | .......... H04L 12/6418 |
| CN | 104683240 B | * | 7/2018 | |

OTHER PUBLICATIONS

Chen et al., "Revised Error Handling for BGP Update Messages", Internet Engineering Task Force (IETF), Request for Comments: 7606, Aug. 2015, 19 pages.

(Continued)

*Primary Examiner* — Younes Naji
(74) *Attorney, Agent, or Firm* — Yao Legal Services, Inc.

(57) ABSTRACT

A system for facilitating remote reachability checks for a switch. During operation, the system can receive one or more control messages from a management platform. Here, a respective control message can include one or more type-length-value (TLV) data structures. If the system identifies a first TLV data structure associated with validation in a first control message, the system can determine a validating plane based on a value of the first TLV data structure. The system can then validate the first control message at the validating plane. Upon identifying, in a second control message, a second TLV data structure associated with a plurality of parameters for a request in the second control message, the system can determine a subset of active parameters from the plurality of parameters based on an indicator in the second TLV data structure. The system can then process the request based on the subset of active parameters.

19 Claims, 9 Drawing Sheets

(56) References Cited

U.S. PATENT DOCUMENTS

2022/0109745 A1* 4/2022 Zhang .................... H04L 69/22
2022/0173992 A1* 6/2022 Filsfils ................ H04L 43/0858

OTHER PUBLICATIONS

Jain et al., "LSP-Ping Mechanisms for EVPN and PBB-EVPN draft-ietf-bess-evpn-lsp-ping-05", BESS Workgroup, ZTE Corporation, Jun. 14, 2021, 17 pages.

Kompella et al., "Detecting Multi-Protocol Label Switched (MPLS) Data Plane Failures", Network Working Group, Request for Comments: 4379, Feb. 2006, 50 pages.

Sajassi et al., "BGP MPLS-Based Ethernet VPN", Internet Engineering Task Force (IETF), Request for Comments: 7432, Feb. 2015, 56 pages.

Tissa Senevirathne, et al., "NVO3 Fault Management: draft-tissa-nvo3-oam-fm-04.txt," May 5, 2017, NV03 Working Group, Internet Draft, <https://datatracker.ietf.org/doc/html/draft-tissa-nvo3-oam-fm-04>.

Boutros et al., "Network Virtualization Overlays (NVO3) Encapsulation Considerations draft-ietf-nvo3-encap-08", NVO3 Workgroup, Internet-Draft, Apr. 30, 2022, 33 pages.

Garg et al., "NVGRE: Network Virtualization Using Generic Routing Encapsulation", Request for Comments: 7637, Sep. 2015, 17 pages.

Gross et al., "Geneve: Generic Network Virtualization Encapsulation", Request for Comments: 8926, Nov. 2020, 37 pages.

Herbert et al., "Generic UDP Encapsulation draft-ietf-nvo3-gue-05", Network Virtualization Overlays (nvo3), Oct. 28, 2016, 72 pages.

Mirsky et al., "OAM for use in GENEVE draft-ietf-nvo3-geneve-oam-05", Jun. 14, 2022, 13 pages.

* cited by examiner

REMOTE REACHABILITY CHECKS IN A DISTRIBUTED TUNNEL FABRIC

BACKGROUND

Field

The present disclosure relates to communication networks. More specifically, the present disclosure relates to a method and system for discovering tunnel neighbors.

BRIEF DESCRIPTION OF THE FIGURES

In the figures, like reference numerals refer to the same figure elements.

DETAILED DESCRIPTION

The following description is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the aspects shown, but is to be accorded the widest scope consistent with the claims.

Internet is the delivery medium for a variety of applications running on physical and virtual devices. Such applications have brought with them an increasing traffic demand. As a result, equipment vendors race to build switches with versatile capabilities. To do so, a switch may support different protocols and services. For example, the switch can support tunneling and virtual private networks (VPNs). The switch can then facilitate overlay routing for a VPN over the tunnels. For example, an Ethernet VPN (EVPN) can be deployed as an overlay over a set of virtual extensible local area networks (VXLANs). To deploy a VPN over the tunnels, a respective tunnel endpoint may map a respective client virtual local area network (VLAN) to a corresponding virtual network identifier (VNI), which can identify a virtual network for a tunnel.

The VNI may appear in a tunnel header that encapsulates a packet and is used for forwarding the encapsulated packet via a tunnel. For example, if the tunnel is formed based on VXLAN, there can be a VNI in the VXLAN header, and a tunnel endpoint can be a VXLAN tunnel endpoint (VTEP). A VNI can also be mapped to the virtual routing and forwarding (VRF) associated with the tunnels if the layer-3 routing and forwarding are needed. Since a VPN can be distributed across the tunnel fabric, a VPN over the tunnel fabric can also be referred to as a distributed tunnel fabric. A gateway of the fabric can be a virtual gateway switch (VGS) shared among a plurality of participating switches.

The aspects described herein solve the problem of remotely facilitating a reachability check for a distributed tunnel fabric from an Operations, Administration, and Management (OAM) system by (i) supporting inactive fields of a sub-TLV (type-length-value) data structure and different validation types for a control message facilitating the reachability check; (ii) indicating the inactive fields in the sub-TLV data structure in a bitmap in the control message; and (iii) indicating the validation type (e.g., control and/or data plane validation) in a TLV data structure of the control message. A respective TLV data structure can include a TLV-encoded data stream and can be referred to as a TLV for short. A sub-TLV data structure can be an internal data structure in a TLV data structure and can be referred to as a sub-TLV for short. Since the format of the control message may include respective fields for a large number of parameters, the inactive fields can allow the OAM system to issue the control message with a targeted subset of parameters. Furthermore, specifying the validation type can reduce processing overhead at the receiver.

With existing technologies, a management port can be used for obtaining information from a switch in a distributed tunnel fabric. Such a switch can be a tunnel endpoint (e.g., a multi-protocol label switching (MPLS) tunnel) reachable via an EVPN. However, obtaining information from a management port of a switch coupling a client device can be challenging because the switch can be a converging point of the fabric, client-side credentials (e.g., connection information), and the physical infrastructure (i.e., the underlying network) of the fabric. Furthermore, the switch may process information (e.g., routing information in control and data planes) for different roles differently. Consequently, obtaining relevant data and control plane information, such as routes in a routing information base (RIB) and the forwarding information base (FIB), for different networks and corresponding roles can be challenging.

An OAM system, which can be a management entity (e.g., an off-the-shelf entity), can facilitate a reachability check for such a switch. The OAM system can run on a controller, such as a provisioning system or a software-defined network (SDN) controller, or a switch in the fabric. Typically, the OAM system can issue a control message, such as a ping message, to determine the reachability information of the switch. In some examples, the ping message can be a Multiprotocol Label Switching (MPLS) label switched path (LSP) ping. The ping message can include an echo-request packet to the switch. Issuing the ping message for a network prefix indicating Network Layer Reachability Information (NLRI) (e.g., prefix information exchanged between Border Gateway Protocol (BGP) peers) may require a corresponding NLRI index in the fabric incorporating a large number of parameters.

A respective parameter of the index can be represented by a corresponding field in a sub-TLV in the control message. The respective values of the parameters are included in the corresponding fields to allow the switch to verify the correctness of the data plane and validate the data plane against the control plane. The switch can then send a response packet (e.g., an echo reply packet) with the validation information. Since the control message may require a prefix key for the index, issuing the control message with an index with a large number of parameters can be challenging. However, a standard OAM system may not support selective access to a particular subset of the parameters using the control message. As a result, determining the reachability information for the OAM system can be inefficient and prone to human errors.

In addition, if the control plane of the switch is at high utilization (e.g., during network topology convergence), processing the control message can strain the resources of the switch. Consequently, the OAM system may not ascertain whether the control plane of the switch is at a steady state due to the unavailability of the processing capability of the switch. Moreover, the switch may reside in a non-local administrative domain (e.g., belong to a different operator). As a result, administrative access to the switch may be unavailable. Under such circumstances, the OAM system may not obtain both control and data plane validations from the switch for the control message.

To solve this problem, the OAM system can support two TLV data structures in the control message in addition to the sub-TLVs corresponding to the parameters in the index. First, a TLV data structure for inactive fields can provide a bitmap indicating which parameters of the index can be in an "inactive" mode. This TLV data structure can be referred to as inactive fields TLV data structure or "inactive fields TLV" for short. The inactive fields TLV allows the receiving switch to ignore the inactive parameters in the control message. The inactive fields TLV can include a sub-TLV comprising an indicator value that indicates the type of the sub-TLV (e.g., whether the sub-TLV is for addresses, multicast, discovery, or a prefix). The indicator value can be a predefined value, such as a value indicated in a technical specification.

Examples of a technical specification include, but are not limited to, an Internet Engineering Task Force (IETF) draft, an IETF Request for Comments (RFC), and an Institute of Electrical and Electronics Engineers (IEEE) specification. The control message can also include a bitmap for the sub-TLV. The value field can include a bitmap indicating which sub-TLVs of the control message are inactive and hence, can be ignored by the switch. The inactive fields correspond to the inactive parameters of the string. This allows the OAM system to issue a parameter-specific control message. For example, to issue a control message for a virtual network identifier (VNI), the OAM system can set the bit corresponding to the field representing a VNI. The rest of the fields of the sub-TLV in the control message can then carry any value since these fields can be ignored by the switch.

Second, another TLV data structure for validation type can indicate how the control message can be validated at the switch. This TLV data structure can be referred to as validation TLV data structure or "validation TLV" for short. The OAM system can set a type indicator value indicating a type of validation for the control message. Upon receiving the control message, the switch can determine whether to validate the control message at the data plane, control plane, or both, depending on the type indicated by the validation TLV. Consequently, the OAM system can issue the control message to the data plane for the relevant parameters even when the control plane is at high utilization. It should be noted that the inactive field and validation TLVs can be used and deployed independently or in conjunction with each other. In this way, the OAM system can efficiently facilitate remote reachability checks associated with a switch in a distributed tunnel fabric.

In this disclosure, the term "switch" is used in a generic sense, and it can refer to any standalone or fabric switch operating in any network layer. "Switch" should not be interpreted as limiting examples of the present invention to layer-2 networks. Any device that can forward traffic to an external device or another switch can be referred to as a "switch." Any physical or virtual device (e.g., a virtual machine or switch operating on a computing device) that can forward traffic to an end device can be referred to as a "switch." Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "message" refers to a group of bits that can be transported together across a network. "Message" should not be interpreted as limiting examples of the present invention to a particular layer of a network protocol stack. "Message" can be replaced by other terminologies referring to a group of bits, such as "packet," "frame," "cell," "datagram," or "transaction." Furthermore, the term "port" can refer to the port that can receive or transmit data. "Port" can also refer to the hardware, software, and/or firmware logic that can facilitate the operations of that port.

Figure 1:
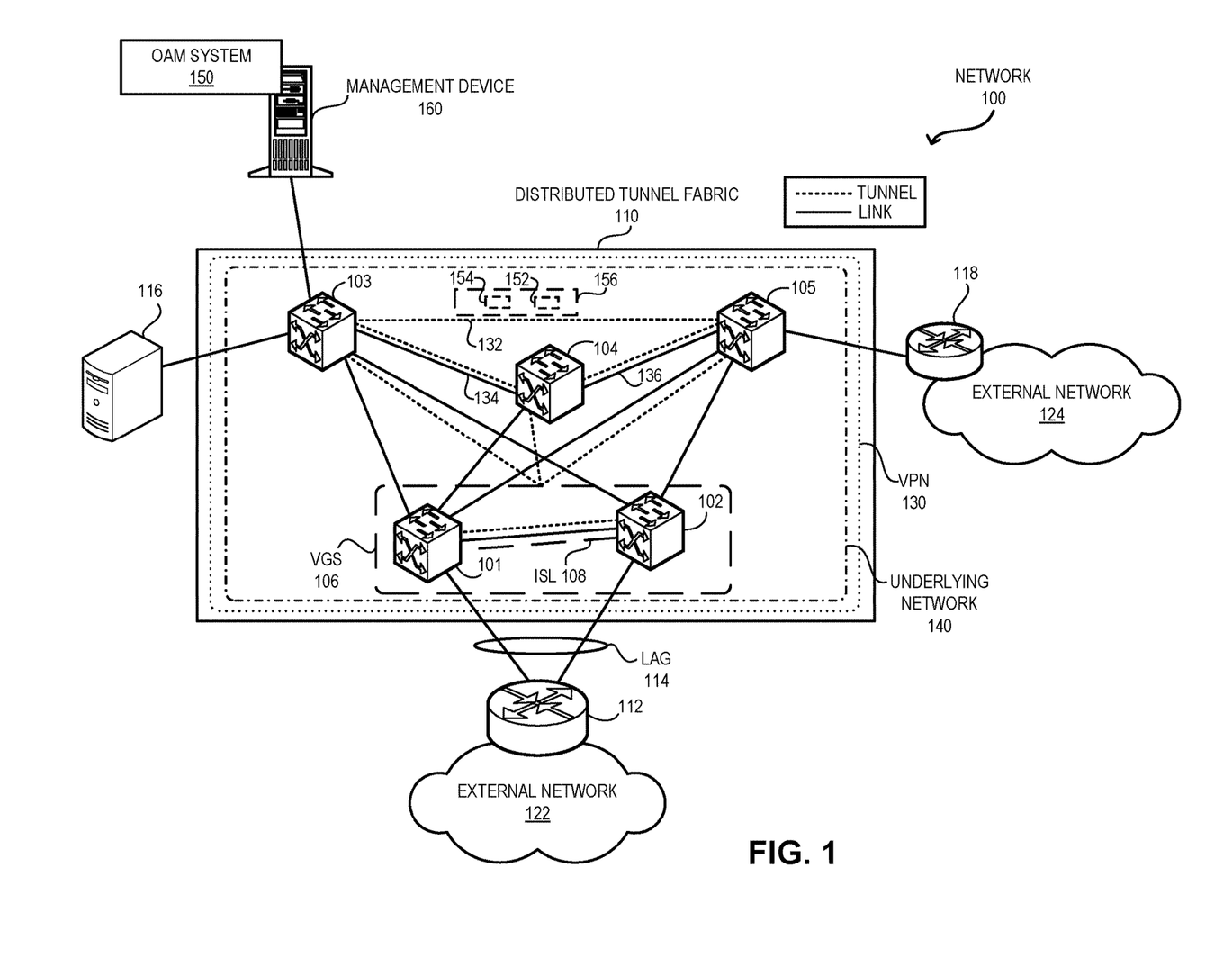
FIG. 1 illustrates an example of a remote reachability check for a distributed tunnel fabric, in accordance with an aspect of the present application.

FIG. 1 illustrates an example of a remote reachability check for a distributed tunnel fabric, in accordance with an aspect of the present application. A network 100 can include a number of switches and devices, and may include heterogeneous network components, such as layer-2 and layer-3 hops, and tunnels. In some examples, network 100 can be an Ethernet, InfiniBand, or other networks, and may use a corresponding communication protocol, such as Internet Protocol (IP), FibreChannel over Ethernet (FCoE), or other protocol. Network 100 can include a distributed tunnel fabric 110 comprising switches 101, 102, 103, 104, and 105, each of which can be associated with a MAC address and an IP address. In fabric 110, switches 103 and 105 are coupled to switch 104 via links 134 and 136, respectively. A tunnel 132 between switches 103 and 105 can span links 134 and 136. Hence, switches 103 and 105 can be tunnel neighbors in fabric 110.

In FIG. 1, a respective link denoted with a dotted line in fabric 110 can be a tunnel. Switches of fabric 110 may form a mesh of tunnels. Examples of a tunnel can include, but are not limited to, VXLAN, Generic Routing Encapsulation (GRE), Network Virtualization using GRE (NVGRE), Generic Networking Virtualization Encapsulation (Geneve), Internet Protocol Security (IPsec), and Multiprotocol Label Switching (MPLS). A respective link denoted with a solid line in fabric 110 can be a link in an underlying network (or an underlay network) 140 of fabric 110. Underlying network 140 can be a physical network, and a respective link of underlying network 140 can be a physical link. A respective switch pair in network 140 can be a BGP peer. A VPN 130, such as an Ethernet VPN (EVPN), can be deployed over fabric 110. Fabric 110 can include a virtual gateway switch (VGS) 106 that can be coupled to an external switch 112 via a link-aggregation group (LAG) 114. Here, LAG 114 can be a multi-chassis LAG (MLAG) and present the links between VGS 106 and switch 112 as an aggregated link.

VGS 106 can couple fabric 110 to an external network 122 via external switch 112. Similarly, switch 105 can couple fabric 110 to an external network 124 via external switch 118. An external network can be a client network. Here, switches 101 and 102 can operate as a single switch in conjunction with each other to facilitate VGS 106. VGS 106 can be associated with one or more virtual addresses (e.g., a virtual IP address and/or a virtual MAC address). A respective tunnel formed at VGS 106 can use the virtual address to form the tunnel endpoint. To efficiently manage data forwarding, switches 101 and 102 can maintain an inter-switch link (ISL) 108 between them for sharing control and/or data packets. ISL 108 can be a layer-2 or layer-3 connection that allows data forwarding between switches 101 and 102. ISL 108 can also be based on a tunnel between switches 101 and 102 (e.g., a VXLAN tunnel).

Because the virtual address of VGS 106 is associated with both switches 101 and 102, other tunnel endpoints, such as switches 103, 104, and 105, of fabric 110 can consider VGS 106 as the other tunnel endpoint for a tunnel instead of switches 101 and 102. To forward traffic toward VGS 106 in fabric 110, a remote switch, such as switch 103, can operate as a tunnel endpoint while VGS 106 can be the other tunnel endpoint. From each of switches 103, 104, and 105, there can be a set of paths (e.g., equal-cost multiple paths or ECMP) to VGS 106. A respective path in underlying network 140 can lead to one of the participating switches of VGS 106. A host (or end devices) 116 can be coupled to switch 103.

With existing technologies, a management port can be used for obtaining information from a switch, such as switch 105, in fabric 110. Here, switch 105 can be a tunnel endpoint for a plurality of tunnels (e.g., tunnel 132) reachable via VPN 130. However, obtaining information from a management port of switch 105 can be challenging because switch 105 can be a converging point of fabric 110, client-side credentials associated with network 124, and underlying network 140 (e.g., link 136). Furthermore, switch 105 may process information (e.g., routing information in control and data planes) for route advertisements from switches 104 and 122 differently. Consequently, obtaining relevant data and control plane information, such as routes in an RIB and an FIB of switch 105, for fabric 110 and network 124 can be challenging.

An OAM system 150, such as a management entity, can facilitate a reachability check to switch 105. OAM system 150 can also be referred to as an OAM platform. OAM system 150 can run on a management device 160. Examples of management device 160 can include, but are not limited to, a controller (e.g., an SDN controller), a provisioning system, and a network device (e.g., a switch in fabric 110). Typically, OAM system 150 can issue a control message 156, such as a ping message, to determine the reachability information of switch 105. Control message 156 can be issued based on an instruction from an administrator, periodically from OAM system 150, or in response to an event in network 100. In some examples, the ping message can include an echo-request packet to switch 105. Issuing the ping message for a network prefix indicating NLRI (e.g., prefix information exchanged between BGP peers) may require a corresponding NLRI index in fabric 110 incorporating a large number of parameters.

A respective parameter of the index can be represented by a corresponding field for a sub-TLV in control message 156. The respective values of the parameters are included in the corresponding fields to allow switch 105 to verify the correctness of the data plane and validate the data plane against the control plane. Switch 105 can then send a response packet (e.g., an echo reply packet) with the validation information. Since control message 156 may require a prefix key for the index, issuing control message 156 with an index with a large number of parameters can be challenging. However, OAM system 150 may not support selective access to a particular subset of the parameters using control message 156. As a result, determining the reachability information at OAM system 150 can be inefficient and prone to human error.

In addition, if the control plane of switch 105 is at high utilization (e.g., during topology convergence of network 140 or 124), processing control message 156 can strain the resources of switch 105. Consequently, OAM system 150 may not ascertain whether the control plane of switch 105 is at a steady state due to the unavailability of the processing capability of switch 105. Moreover, switch 105 may reside in a non-local administrative domain (e.g., associated with network 124). As a result, administrative access to switch 105 may be unavailable. Under such circumstances, OAM system 150 may not obtain both control and data plane validations from switch 105 for control message 156.

To solve this problem, OAM system 150 can support two TLV data structures for control message 156. First, a TLV data structure 152 for inactive fields can provide a bitmap indicating which parameters of the index can be in an inactive mode. TLV data structure 152 can be referred to as inactive field TLV 152. Inactive field TLV 152 allows switch 105 to ignore the inactive parameters in control message 156. Inactive field TLV 152 can include a sub-TLV comprising an indicator value that indicates the type of the sub-TLV in control message 156. The indicator value can be a predefined value defined in a technical specification and supported by network devices, such as switches 103 and 105. In some examples, even if the predefined value is preconfigured at switch 105, switch 105 may not support ignoring the inactive parameters. Switch 105 can then process a respective field of the sub-TLV of control message 156.

The bitmap in type 152 can indicate which fields of the sub-TLV in control message 156 are inactive and hence, can be ignored by switch 105. The inactive fields correspond to the inactive parameters of the string. This allows OAM system 150 to issue a parameter-specific control message. For example, if control message 156 is to be issued for a VNI, OAM system 150 can set the bit corresponding to the field representing a VNI in the sub-TLV of control message 156. The rest of the fields in the sub-TLV of control message 156 can then carry any value (e.g., non-meaningful value) since these fields can be ignored by switch 105.

Second, another TLV data structure 154 of control message 156 can indicate how control message 156 can be validated at switch 105. TLV data structure 154 can be referred to as validation TLV 154. OAM system 150 can set a type indicator value indicating a type of validation for control message 156 in validation TLV 154. Upon receiving control message 156, switch 105 can determine whether to validate control message 156 at the data plane, control plane, or both, depending on the type indicated by validation TLV 154. Consequently, OAM system 150 can issue control message 156 to the data plane for the relevant parameters even when the control plane of switch 105 is at high utilization.

OAM system 150 may include TLVs 152 and 154 in the same control message 156 or issue separate control messages with TLVs 152 and 154. Furthermore, OAM system 150 may include TLV 152, TLV 154, or both in control message 156. Similarly, switch 105 may support TLV 152, TLV 154, or both. In other words, TLVs 152 and 154 can be used and deployed independently or in conjunction with each other. In this way, OAM system 150 can efficiently facilitate remote reachability checks associated with a switch in fabric 110.

Figure 2A:
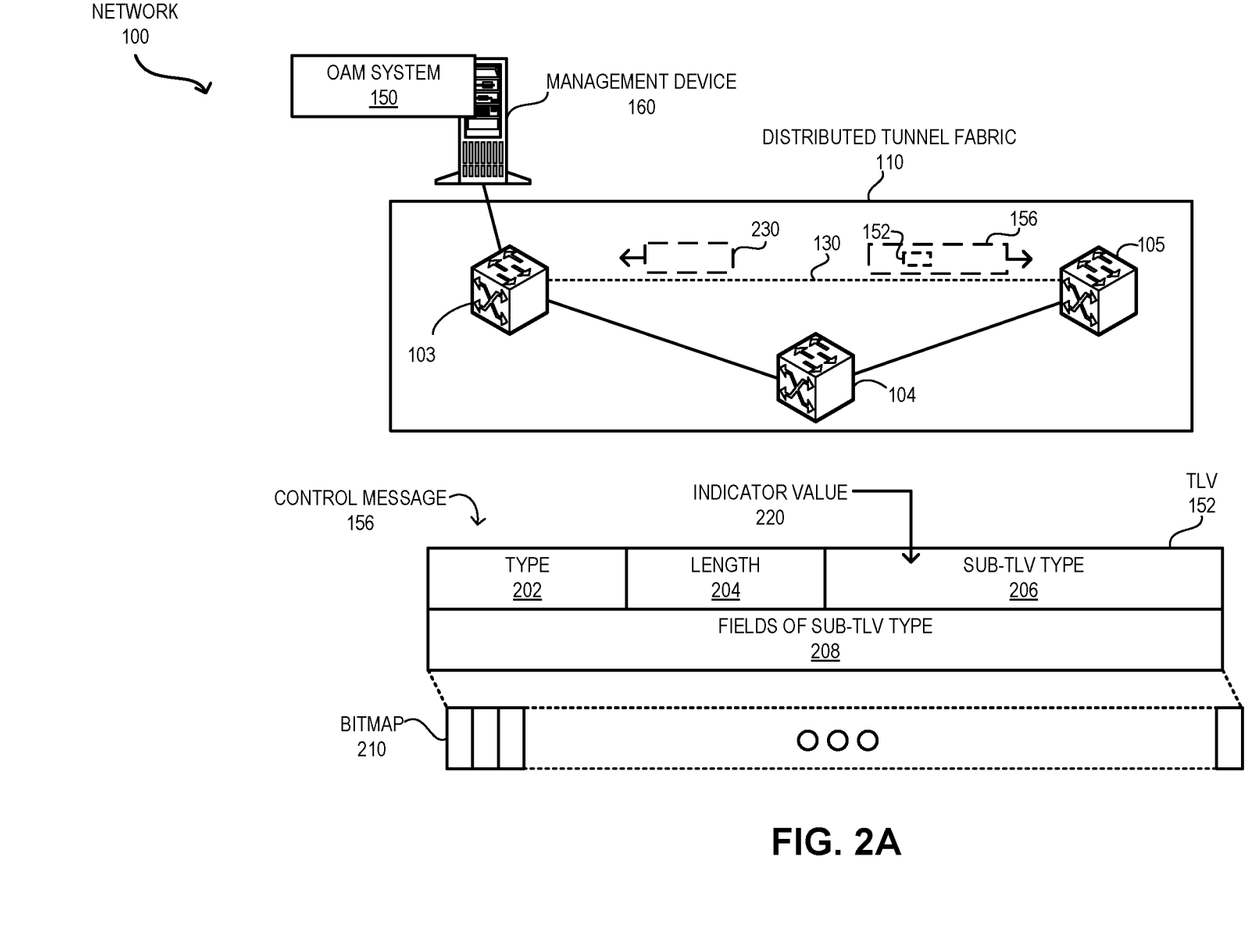
FIG. 2A illustrates an example of a type-length-value (TLV) data structure indicating inactive fields in a sub-TLV of a control message facilitating reachability check for a distributed tunnel fabric, in accordance with an aspect of the present application.

FIG. 2A illustrates an example of a TLV data structure indicating inactive fields in a sub-TLV of a control message facilitating reachability check for a distributed tunnel fabric, in accordance with an aspect of the present application. Since OAM system 150 can issue control message 156 for switch 105, which is in a distributed tunnel fabric 110, the prefix key associated with the corresponding route prefix can incorporate a number of parameters. Such parameters can include one or more of: route distinguisher (RD), route type (RT), Ethernet Segment Index (ESI), Ethernet tag, an Internet Protocol (IP) prefix, a media access control (MAC) address, an IP address, and a VNI.

Control message 156 can include a corresponding sub-TLV for each of these parameters. Based on TLV 152, OAM system 150 can indicate which of these parameters of control message 156 can be inactive. As a result, control message 156 can become parameter-specific. Here, reducing the burden of remembering a large number of parameters can reduce the likelihood of human errors. Since OAM system 150 can issue control message 156 for specific parameters, the rest of the parameters can be indicated as inactive in TLV 152. The inactive parameters can be considered as "wildcard" or "don't-care" values. For example, OAM system 150 can issue a control message 156 (e.g., as an MPLS LSP ping) for an IP prefix to the tunnel endpoint IP address of switch 105.

TLV 152 can then indicate that the fields associated with RD, ESI, and Ethernet tag in control message 150 as inactive, thus simplifying the operations of OAM system 150. Since TLV 152 can be carried by control message 156, TLV 152 can dictate which sub-TLVs are inactive to switch 105. For example, if OAM system 150 indicates that the sub-TLV associated with RD is inactive, upon receiving control message 156, switch 105 can determine that RD validation is not needed for control message 156 and the values in the corresponding field of the sub-TLV can be ignored.

TLV 152 can include a number of fields, such as type 202, length 204, a sub-TLV type 206, and fields 208 for sub-TLV type 206. Type 202 can be a predefined value, such as a proprietary value associated with OAM system 150 or a value indicated in a technical specification. Type 202 can indicate that TLV 152 is an inactive field TLV. Length 204 can indicate the length of TLV 152. Furthermore, sub-TLV type 206 can include an indicator value 220 that indicates the type of a sub-TLV. Examples of a sub-TLV in control message 156 can include, but are not limited to, an addresss sub-TLV (e.g., for IP and MAC addresses in an EVPN), a multiast sub-TLV (e.g., for inclusive multicast), a discovery sub-TLV (e.g., for Ethernet auto-discovery in an EVPN), and an IP prefix sub-TLV.

Fields 208 can include the fields associated with sub-TLV type 206. For example, if sub-TLV type 206 corresponds to a MAC address sub-TLV for an EVPN, indicator value 220 can be 2 based on IETF RFC 7432, the disclosure of which is incorporated by reference herein. Fields 208 can then include respective fields for RD, RT, ESI, Ethernet tag, IP prefix, MAC address, IP address, and VNI. Fields 208 can also include a bitmap 210 to indicate which of these fields can be inactive for sub-TLV type 206. It should be noted that control message 156 can carry one or more sub-TLVs. A corresponding bitmap can be included in the fields of a respective sub-TLV. If switch 105 does not support an inactive field TLV (e.g., TLV 152), switch 105 can process control message 156 without considering TLV 152. In other words, even if switch 105 does not support TLV 152, switch 105 can process the sub-TLVs in control message 156 by ignoring TLV 152.

Furthermore, switch 105 may support TLV 152 but may not support ignoring a field of a sub-TLV. Under such circumstances, switch 105 can send an error message to OAM system 150 indicating that TLV 152 is not recognized (or processed) at switch 105. The error message may include a corresponding error code. On the other hand, if switch 105 supports TLV 152, switch 105 can obtain bitmap 210 from control message 156 and map a respective bit of bitmap 210 to a corresponding field associated with sub-TLV type 206 in control message 156. If a bit is set in bitmap 210, switch 105 can determine that the corresponding fields are inactive and hence, can be ignored. Switch 105 can then perform validation at the data plane, control plane, or both based on the active values. Upon performing the validation, switch 105 can send a response message 230 indicating success and/or error based on the corresponding technical specification.

Figure 2B:
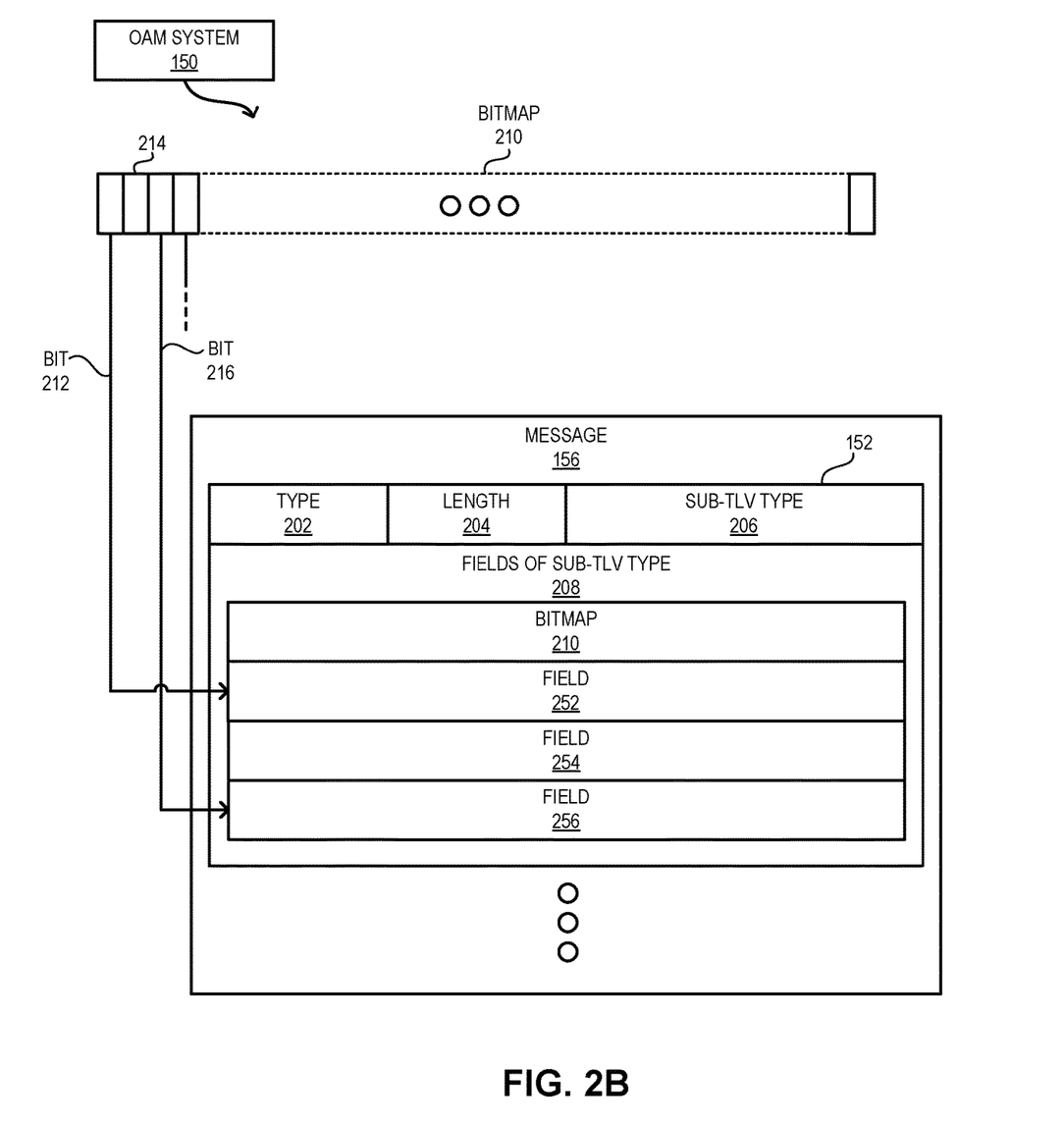
FIG. 2B illustrates an example of a bitmap indicating inactive fields in a sub-TLV of a control message facilitating reachability check for a distributed tunnel fabric, in accordance with an aspect of the present application.

FIG. 2B illustrates an example of a bitmap indicating inactive fields in a sub-TLV of a control message facilitating reachability check for a distributed tunnel fabric, in accordance with an aspect of the present application. Here, fields 208 can include the fields, such as fields 252, 254, and 256, associated with sub-TLV type 206. Suppose that sub-TLV type 206 corresponds to addresses sub-TLV for an EVPN. If OAM system 150 determines that the RD field for sub-TLV type 206 should be inactive, OAM system 150 can determine that the first field 252 of sub-TLV type 206 corresponds to RD. OAM system 150 can then set the first bit (i.e., bit 212) of bitmap 210 to indicate that field 252 is inactive and hence, can be ignored by the receiving switch.

Similarly, if OAM system 150 determines that the ESI field for sub-TLV type 206 should be inactive, OAM system 150 can determine that the third field 256 of sub-TLV type 206 corresponds to ESI. OAM system 150 can then set the third bit (bit 216) of the bitmap to indicate that the ESI field is inactive and ignorable by the receiving switch. If bit 214 is not set in bitmap 210, corresponding field 254 can be processed by the receiving switch. Bitmap 210 may appear in any location within fields 208, such as before or after the rest of the fields. Furthermore, even though a bit of bitmap is set if a corresponding field is inactive in this example, the bits of bitmap 210 can be flipped for the same indication. A set bit can then indicate an active field and an unset bit can indicate an inactive field.

Figure 3A:
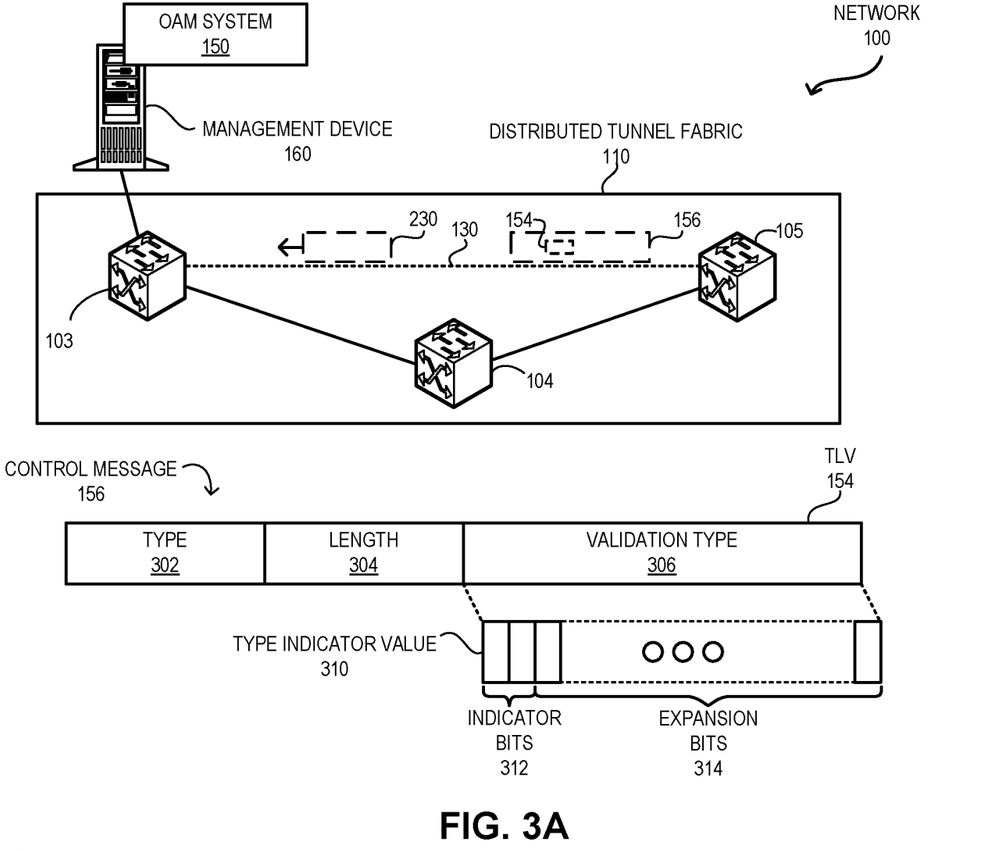
FIG. 3A illustrates an example of a TLV data structure indicating a validation type for a control message facilitating reachability check for a distributed tunnel fabric, in accordance with an aspect of the present application.

FIG. 3A illustrates an example of a TLV data structure indicating a validation type for a control message facilitating reachability check for a distributed tunnel fabric, in accordance with an aspect of the present application. TLV 154 can indicate the validation type to be performed for control message 156 at switch 105 before response 230 can be corroborated and sent back to OAM system 150. TLV 154 can include a number of fields, such as type 302, length 304, and a validation type 306. Type 302 can be a predefined value, such as a proprietary value associated with OAM system 150 or a value indicated in a technical specification. Type 302 can indicate that TLV 154 is a validation TLV. Length 304 can indicate the length of TLV 154.

Validation type 306 can include a type indicator value 310 that indicates the type of validation for control message 156. Validation type 306 can include a plurality of bits. A first subset of the bits of validation type 306 can include indicator bits 312 that indicate the type of validation for control message 156. Indicator bits 312 can be used to determine type indicator value 310. The second subset of bits, which includes the rest of the bits, can be extension bits 314 that can be used for extending the options for validation type. For example, a portion of extension bits 314 can be incorporated into indicator bits 312 if a current set of indicator bits 312 is insufficient to indicate the possible validation types of control message 156.

In some examples, if type indicator value 310 indicates a value of "0," switch 105 can determine that control message 156 should be validated in both control and data planes. This option can be the default option for validation. Moreover, a value of "1" and "2" for type indicator value 310 can indicate that control message 156 should be validated in the control plane and data plane, respectively. The number of indicator bits 312 can then be two, which is sufficient to represent the validation types for control message 156. If validation type 306 includes more than two bits, the rest of the bits can be included in extension bits 314.

If switch 105 does not support a validation TLV (e.g., TLV 154), switch 105 can process control message 156 without considering TLV 154. In other words, even if switch 105 does not support TLV 154, switch 105 can process the sub-TLVs in control message 156 using the default option by ignoring TLV 154. In some examples, switch 105 can also send an error message to OAM system 150 indicating that TLV 154 is not recognized (or processed) at switch 105. The error message may include a corresponding error code. Furthermore, switch 105 may support TLV 154 but may not support validation using a non-default option (i.e., validation in control or data plane only). Under such circumstances, switch 105 can process the sub-TLVs in control message 156 using the default option. On the other hand, if switch 105 supports TLV 154, switch 105 can perform the validation using the requested option in type indicator value 310.

Figure 3B:
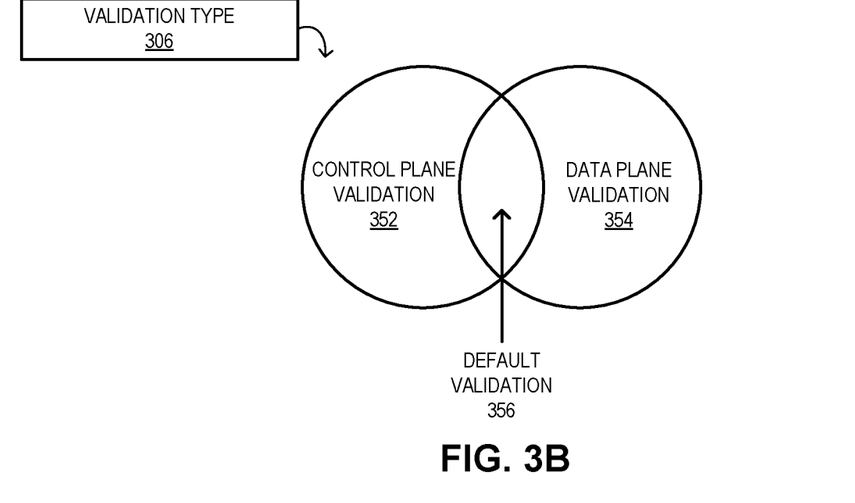
FIG. 3B illustrates examples of validation types for a control message facilitating reachability check for a distributed tunnel fabric, in accordance with an aspect of the present application.

FIG. 3B illustrates examples of validation types for a control message facilitating reachability check for a distributed tunnel fabric, in accordance with an aspect of the present application. If the volume of routing data is significant and the control plane is converging (e.g., in the middle of a churn), it can be difficult to ascertain whether a remote network, such as a remote site or a service provider network, is in a steady-state. In particular, since a control message can be validated in the data plane while forgoing a control plane validation, validation type 306 can facilitate a validation option for a receiving switch without increasing processing overhead. On the other hand, if administrative access to a receiving device is unavailable, the control plane information can be obtained based only on the control plane.

Accordingly, validation type 306 can indicate control plane validation 352, data plane validation 356, and default validation 356. The default validation can include both data and control plane validations. Data plane validation 354 can be applied for validating the parameters associated with the FIB or a routing, switching, or bridging table. Control plane validation 352 can be applied for validating parameters associated with the protocol(s) producing the routes. For example, parameters RD, RT, ESI, and Ethernet tag are usually associated with the control plane and hence, can be validated based on control plane validation 352.

Default validation 356 can be performed in a newly-installed network to detect potential errors. In addition, default validation 356 can be suitable before and after an upgrade in the network when the network is in a steady state and the switches are not experiencing protocol churns. Since the processing capacity of such a switch may not be at a high-utilization level, the switch can support default validation 356 without impacting the performance. Moreover, validation associated with a next-hop switches, a VNI, and an Ethernet Virtual Interconnect (EVI) can be candidate for default validation 356.

Figure 4A:
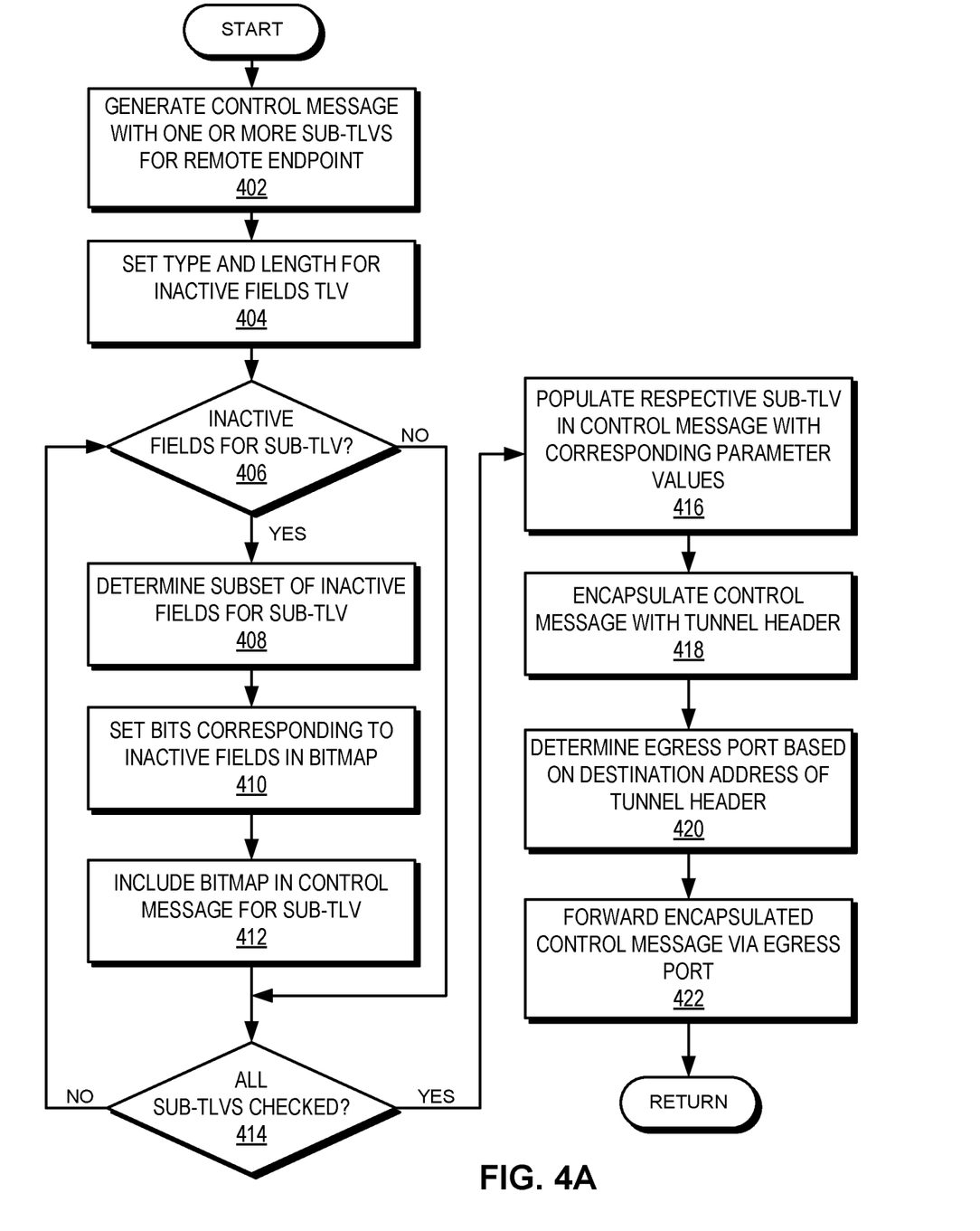
FIG. 4A presents a flowchart illustrating the process of an Operations, Administration, and Management (OAM) system issuing a control message that indicates inactive fields in a sub-TLV, in accordance with an aspect of the present application.

FIG. 4A presents a flowchart illustrating the process of an OAM system issuing a control message that indicates inactive fields in a sub-TLV, in accordance with an aspect of the present application. During operation, the system can generate a control message with one or more sub-TLVs for a remote endpoint (operation 402) and set a type and length for the inactive fields TLV (operation 404). The system can then determine whether any fields can be inactive for a sub-TLV (operation 406). If one or more fields can be inactive for the sub-TLV, the system can determine a subset of inactive fields for the sub-TLV (operation 408).

The system can then set the bits corresponding to the inactive fields in a bitmap (operation 410) and include the bitmap in the control message for the TLV (operation 412). Upon including the bitmap (operation 412) or if no field can be inactive for the sub-TLV (operation 406), the system can determine whether all sub-TLVs are checked for the control message (operation 414). If all sub-TLVs are not checked, the system can continue to determine whether any fields can be inactive for another sub-TLV (operation 406).

On the other hand, if all sub-TLVs are checked, the system can populate a respective sub-TLV in the control message with corresponding parameter values (operation 416). The system can then encapsulate the control message with a tunnel header (operation 418). Subsequently, the system can determine an egress port based on the destination address of the tunnel header (i.e., the address of the remote endpoint) (operation 420) and forward the encapsulated control message via the egress port (operation 422).

Figure 4B:
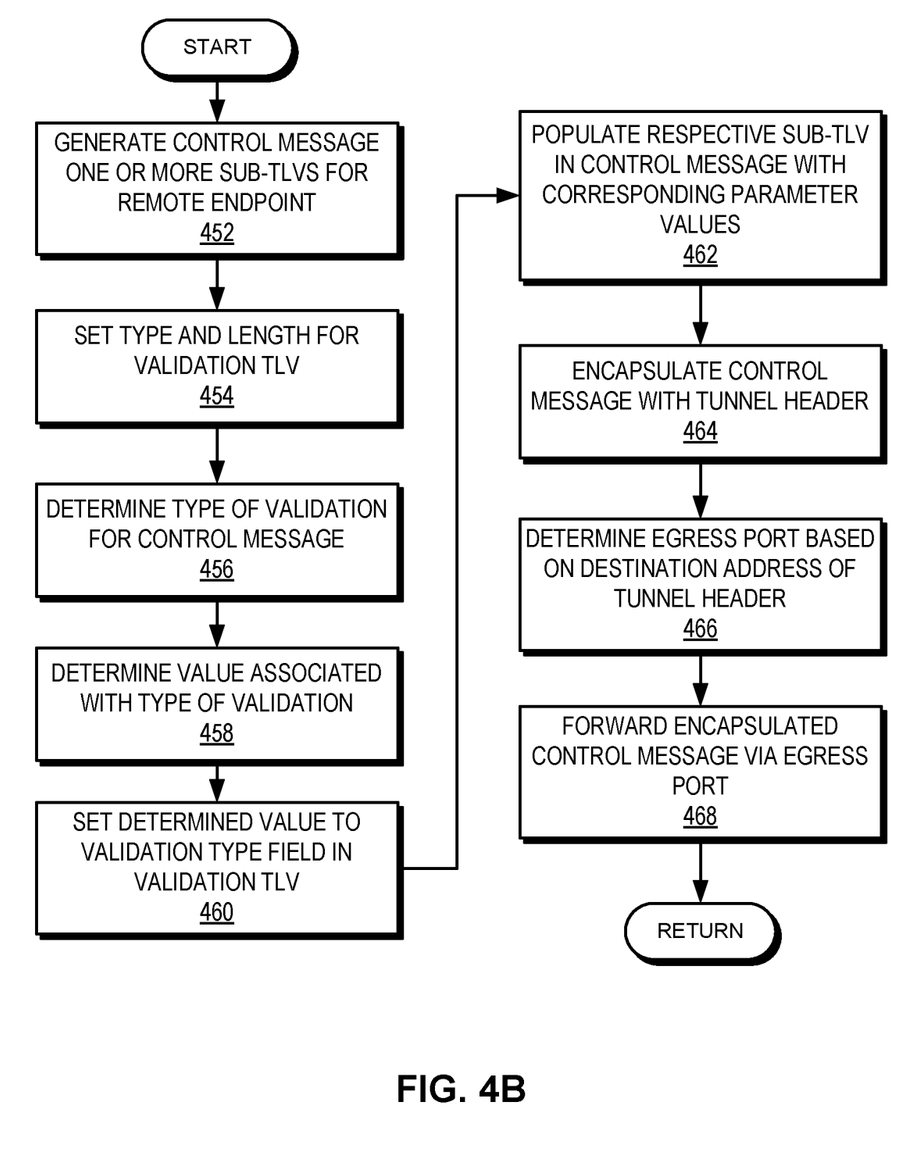
FIG. 4B presents a flowchart illustrating the process of an OAM system issuing a control message that indicates a validation type for a receiver, in accordance with an aspect of the present application.

FIG. 4B presents a flowchart illustrating the process of an OAM system issuing a control message that indicates a validation type for a receiver, in accordance with an aspect of the present application. During operation, the system can generate a control message with one or more sub-TLVs for a remote endpoint (operation 452) and set a type and length for the validation TLV (operation 454). The system can then determine the type of validation for the control message (operation 456) and determine a value associated with the type of validation (operation 458). The system can then set the determined value to the validation type field in the validation TLV (operation 460).

The system can populate a respective sub-TLV in the control message with corresponding parameter values (operation 462). The system can then encapsulate the control message with a tunnel header (operation 464). Subsequently, the system can determine an egress port based on the destination address of the tunnel header (i.e., the address of the remote endpoint) (operation 466) and forward the encapsulated control message via the egress port (operation 468).

Figure 5A:
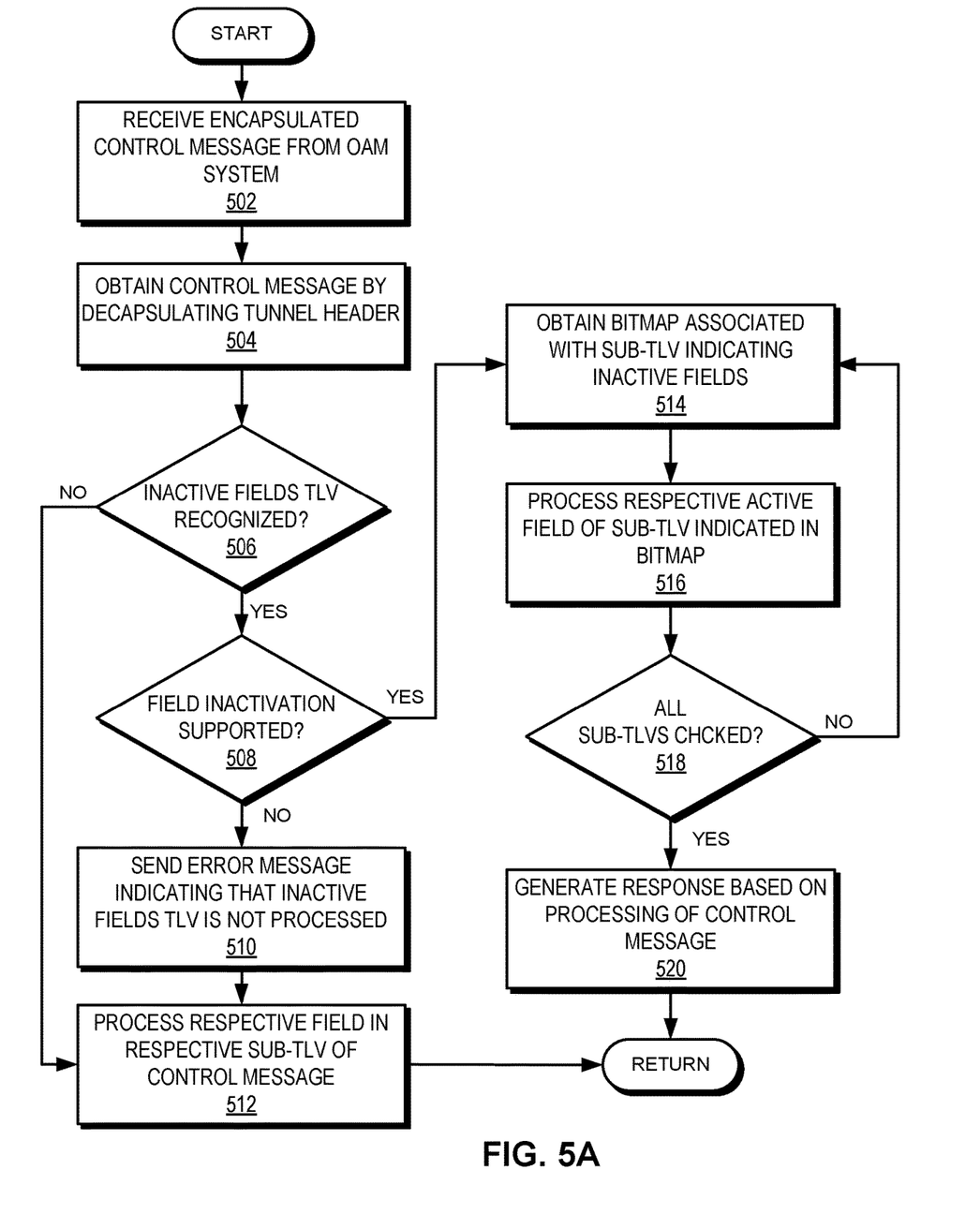
FIG. 5A presents a flowchart illustrating the process of an endpoint in a distributed tunnel fabric responding to a control message that indicates inactive fields in a sub-TLV, in accordance with an aspect of the present application.

FIG. 5A presents a flowchart illustrating the process of an endpoint in a distributed tunnel fabric responding to a control message that indicates inactive fields in a sub-TLV, in accordance with an aspect of the present application. During operation, the endpoint can receive an encapsulated control message from an OAM system (operation 502) and obtain the control message by decapsulating the tunnel header (operation 504). The endpoint can then determine whether the inactive fields TLV is recognized by the endpoint (operation 506). If the inactive fields TLV is recognized, the endpoint can determine whether the field inactivation is supported by the endpoint (operation 508).

If the field inactivation is not supported by the endpoint, the endpoint can send an error message indicating that the inactive fields TLV is not supported (operation 510). If the inactive fields TLV is not recognized (operation 506) or upon sending the error message (operation 510), the endpoint can process a respective field in a respective sub-TLV of the control message (operation 512). If the field inactivation is supported by the endpoint, the endpoint can obtain a bitmap associated with a sub-TLV indicating inactive fields (operation 514) and process a respective active field of the sub-TLV indicated in the bitmap (operation 516).

The endpoint can then determine whether all sub-TLVs of the control message are checked (operation 518). If all sub-TLVs of the control message are not checked, the endpoint can continue to obtain a bitmap associated with another sub-TLV indicating inactive fields (operation 514) and process a respective active field of the other sub-TLV indicated in the bitmap (operation 516). On the other hand, if all sub-TLVs of the control message are checked, the endpoint can generate a response based on the processing of the control message (operation 520).

Figure 5B:
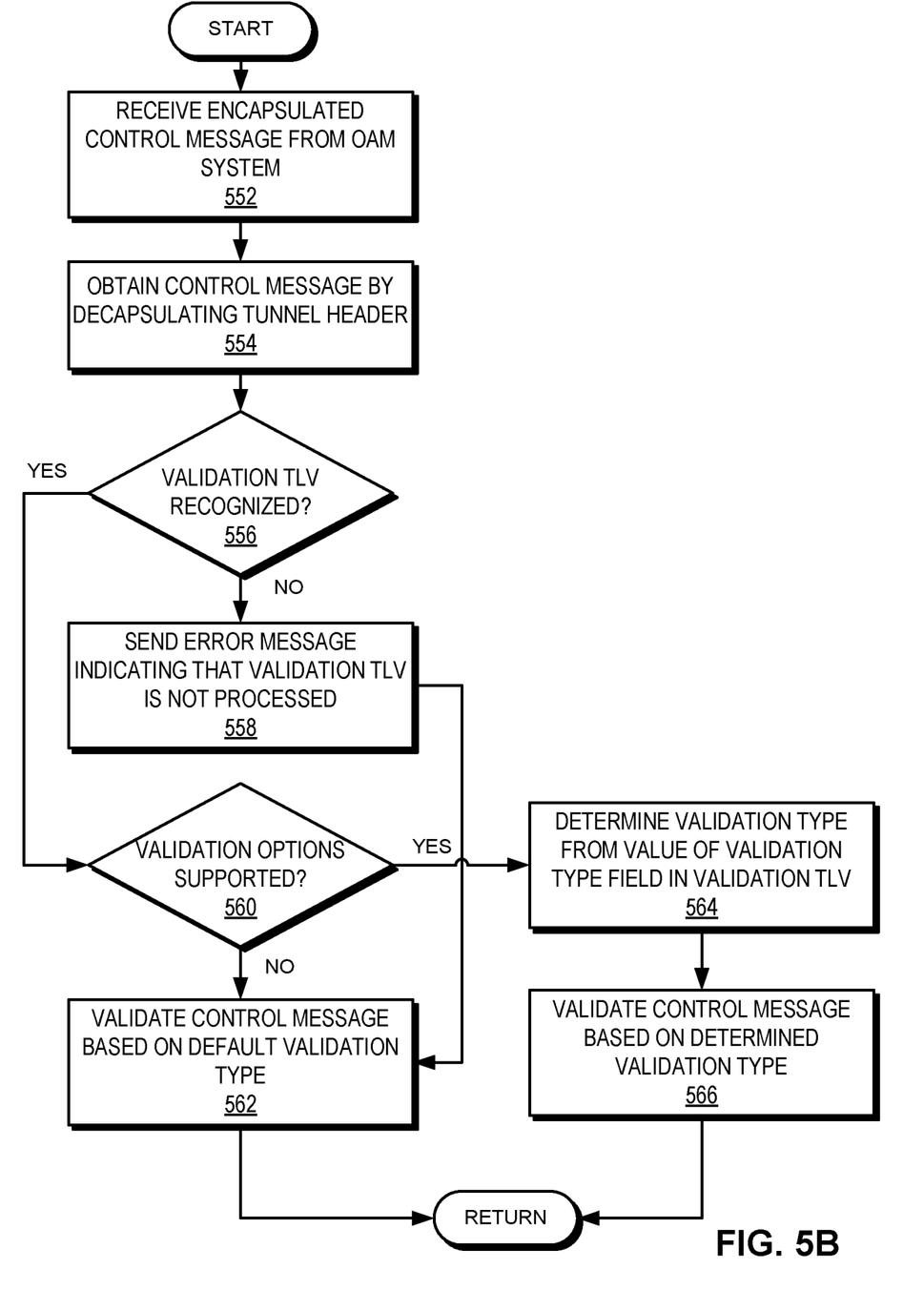
FIG. 5B presents a flowchart illustrating the process of an endpoint in a distributed tunnel fabric performing a validation based on a control message that indicates a validation type, in accordance with an aspect of the present application.

FIG. 5B presents a flowchart illustrating the process of an endpoint in a distributed tunnel fabric performing a validation based on a control message that indicates a validation type, in accordance with an aspect of the present application. During operation, the endpoint can receive an encapsulated control message from an OAM system (operation 552) and obtain the control message by decapsulating the tunnel header (operation 554). The endpoint can then determine whether the validation TLV is recognized by the endpoint (operation 556). If the validation TLV is not recognized, the endpoint can send an error message indicating that the validation TLV is not supported (operation 558).

If the validation TLV is recognized, the endpoint can determine whether validation options are supported by the endpoint (operation 564). If the validation options are not supported (operation 560) or upon sending the error message (operation 558), the endpoint can validate the control message based on the default validation type (operation 562). If the validation options are supported by the endpoint, the endpoint can determine the validation type from the value of the validation field in the validation TLV (operation 564). The endpoint can then validate the control message based on the determined validation type (operation 566).

Figure 6:
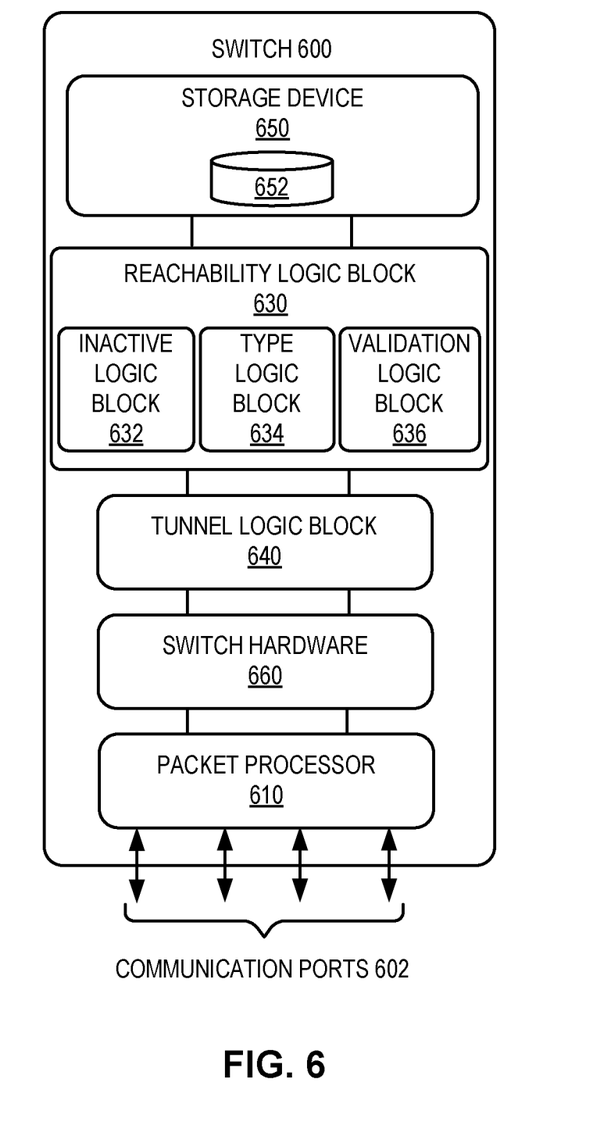
FIG. 6 illustrates an example of a switch supporting the remote reachability check, in accordance with an aspect of the present application.

FIG. 6 illustrates an example of a switch supporting the remote reachability check, in accordance with an aspect of the present application. In this example, a switch 600 can include a number of communication ports 602, a packet processor 610, and a storage device 650. Switch 600 can also include switch hardware 660 (e.g., processing hardware of switch 600, such as its application-specific integrated circuit (ASIC) chips), which includes information based on which switch 600 processes packets (e.g., determines output ports for packets). Packet processor 610 can extract and processes header information from the received packets. Packet processor 610 can identify a switch identifier (e.g., a MAC address and/or an IP address) associated with switch 600 in the header of a packet.

Communication ports 602 can include inter-switch communication channels for communication with other switches and/or user devices. The communication channels can be implemented via a regular communication port and based on any open or proprietary format. Communication ports 602 can include one or more Ethernet ports capable of receiving frames encapsulated in an Ethernet header. Communication ports 602 can also include one or more IP ports capable of receiving IP packets. An IP port is capable of receiving an IP packet and can be configured with an IP address. Packet processor 610 can process Ethernet frames and/or IP packets. A respective port of communication ports 602 may operate as an ingress port and/or an egress port.

Switch 600 can maintain a database 652 (e.g., in storage device 650). Database 652 can be a relational database and may run on one or more Database Management System (DBMS) instances. Database 652 can store information associated with routing, configuration, and interface of switch 600. Switch 600 can include a tunnel logic block 640 that can establish a tunnel with a remote switch, thereby allowing switch 600 to operate as a tunnel endpoint. Switch 600 can include a reachability logic block 630 that can facilitate remote reachability check for switch 600. Reachability logic block 630 can include an inactive logic block 632, a type logic block 634, and a validation logical block 636.

Inactive logic block 632 can determine whether a control message includes the inactive fields TLV and process the active fields of a respective sub-TLV of the control message. Type logic block 634 can determine a requested validation type of the control message. Validation logic block 636 can validate the active fields of the control message based on the requested validation type. Validation logic block 636 can also send a response message based on the validation.

One aspect of the present technology can provide a system for facilitating remote reachability checks for a switch. During operation, the system can receive one or more control messages from an operations, administration, and management (OAM) platform. Here, a respective control message can include one or more type-length-value (TLV) data structures. A respective TLV data structure can include TLV-encoded data. If the system identifies a first TLV data structure associated with validation in a first control message from the OAM platform, the system can determine a validating plane for the first control message based on a value of the first TLV data structure. The system can then validate the first control message at the validating plane. Furthermore, if the system identifies, in a second control message from the OAM platform, a second TLV data structure associated with a plurality of parameters corresponding to a request in the second control message, the system can determine a subset of active parameters from the plurality of parameters based on an indicator in the second TLV data structure. The system can then process the request in the second control message based on the subset of active parameters.

In a variation on this aspect, the indicator can include a bitmap comprising a plurality of bits. A respective bit of the bitmap can then indicate whether a corresponding parameter of the plurality of parameters is active.

In a variation on this aspect, the switch can be a tunnel endpoint of a virtual private network (VPN) tunnel. A respective control message can then include a ping message for checking reachability information over a VPN tunnel to the switch.

In a further variation, the system can identify a sub-TLV type in the second TLV data structure. The sub-TLV type can indicate a type of ping message for a VPN tunnel and can be associated with the plurality of parameters.

In a variation on this aspect, the system can validate the second control message at data and control planes in response to identifying one or more of: the absence of the first TLV data structure in the second control message, the lack of local support for the first TLV data structure, and the lack of local support for validation in the validation plane.

In a variation on this aspect, the system can process the request based on the plurality of parameters in response to identifying one or more of: the lack of local support for the second TLV data structure and lack of local support for processing the request based on the subset of active parameters.

In a variation on this aspect, the system can determine a subset of inactive parameters indicated by the indicator as wildcard parameters.

In a variation on this aspect, the system can determine the validating plane for the second control message by determining whether to validate in a data plane, control plane, or both based on the value of the first TLV data structure.

In a variation on this aspect, the first and second control messages are in the same control message. The system can then process the request by validating the subset of active parameters at the validating plane.

In a variation on this aspect, the request in the second control message includes a validation request for the plurality of parameters. The system can then process the request by generating a response indicating validation of the subset of active parameters for the OAM system.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method comprising:
receiving, by a switch, a first control message and a second control message from an operations, administration, and management (OAM) platform, wherein a respective control message of the first and second control messages comprises a type-length-value (TLV) data structure, wherein the TLV data structure includes TLV-encoded data;
based on identifying, in the first control message from the OAM platform, a first TLV data structure associated with validation:
determining a validating plane for the first control message based on a value of the first TLV data structure; and
validating the first control message at the validating plane;
based on identifying, in the second control message from the OAM platform, a second TLV data structure comprising a plurality of fields, wherein the plurality of fields include parameter fields containing a plurality of parameters corresponding to a request in the second control message:
determining, based on information in a further field of the plurality of fields in the second TLV data structure, a subset of active parameters from the plurality of parameters, wherein the information in the further field in the second TLV data structure comprises a first indicator identifying a first parameter of the plurality of parameters as active, and a second indicator identifying a second parameter of the plurality of parameters as inactive, the first parameter being part of the subset of active parameters; and
processing the request in the second control message based on the subset of active parameters, wherein the request in the second control message includes a validation request for the plurality of parameters, and wherein processing the request comprises generating, for the OAM platform, a response indicating a validation of the subset of active parameters.

2. The method of claim 1, wherein the information in the further field comprises a bitmap comprising a plurality of bits, wherein a respective bit of the bitmap indicates whether a corresponding parameter of the plurality of parameters is active, and wherein the first indicator comprises a first bit of the bitmap, and the second indicator comprises a second bit of the bitmap.

3. The method of claim 1, wherein the switch comprises a tunnel endpoint of a virtual private network (VPN) tunnel, and wherein the second control message includes a ping message for checking reachability information over the VPN tunnel to the switch.

4. The method of claim 3, further comprising identifying a sub-TLV data structure type in the second TLV data structure, wherein the sub-TLV data structure type corresponds to a type of the ping message for the VPN tunnel and is associated with the plurality of parameters.

5. The method of claim 1, wherein the determining of the validating plane for the first control message based on the value of the first TLV data structure comprises selecting from among a data plane to perform the validating or a control plane to perform the validating.

6. The method of claim 1, further comprising:
validating, in response to the request in the second control message, a data plane of the switch.

7. The method of claim 1, comprising:
determining, based on the information in the further field in the second TLV data structure, a subset of inactive parameters of the plurality of parameters.

8. The method of claim 1, wherein the determining of the validating plane for the first control message comprises selecting both a data plane and a control plane of the switch to perform the validating.

9. The method of claim 7, wherein the subset of inactive parameters are treated as wildcard values by the switch.

10. A non-transitory computer-readable storage medium storing instructions that when executed cause a switch to:
receive, at the switch, a first control message and a second control message from an operations, administration and management (OAM) platform, wherein a respective control message of the first and second control messages comprises a type-length-value (TLV) data structure, wherein the TLV data structure includes TLV-encoded data;
based on identifying, in the first control message from the OAM platform, a first TLV data structure associated with validation:
determine a validating plane of the switch for the first control message based on a value of the first TLV data structure; and
validate the first control message at the validating plane;
based on identifying, in the second control message from the OAM platform, a second TLV data structure comprising a plurality of fields, wherein the plurality of fields include parameter fields containing a plurality of parameters corresponding to a request in the second control message:
determine, based on information in a further field of the plurality of fields in the second TLV data structure, a subset of active parameters from the plurality of parameters, wherein the information in the further field in the second TLV data structure comprises a first indicator identifying a first parameter of the plurality of parameters as active, and a second indicator identifying a second parameter of the plurality of parameters as inactive, the first parameter being part of the subset of active parameters; and
process the request in the second control message based on the subset of active parameters, wherein the request in the second control message includes a validation request for the plurality of parameters, and wherein processing the request comprises generating, for the OAM platform, a response indicating a validation of the subset of active parameters.

11. The non-transitory computer-readable storage medium of claim 10, wherein the information in the further field comprises a bitmap comprising a plurality of bits, wherein a respective bit of the bitmap indicates whether a corresponding parameter of the plurality of parameters is active, and wherein the first indicator comprises a first bit of the bitmap, and the second indicator comprises a second bit of the bitmap.

12. The non-transitory computer-readable storage medium of claim 10, wherein the switch comprises a tunnel endpoint of a virtual private network (VPN) tunnel, and wherein the second control message includes a ping message for checking reachability information over the VPN tunnel to the switch.

13. The non-transitory computer-readable storage medium of claim 12, wherein the instructions when executed cause the switch to:
identify a sub-TLV data structure type in the second TLV data structure, wherein the sub-TLV data structure type corresponds to a type of the ping message for the VPN tunnel and is associated with the plurality of parameters.

14. The non-transitory computer-readable storage medium of claim 10, wherein the determining of the validating plane for the first control message based on the value of the first TLV data structure comprises selecting from among a data plane of the switch to perform the validating or a control plane of the switch to perform the validating.

15. The non-transitory computer-readable storage medium of claim 10, wherein the instructions when executed cause the switch to:
validate, in response to the request in the second control message, a data plane of the switch.

16. The non-transitory computer-readable storage medium of claim 10, wherein the instructions when executed cause the switch to:
determine, based on the information in the further field in the second TLV data structure, a subset of inactive parameters of the plurality of parameters.

17. The non-transitory computer-readable storage medium of claim 10, wherein the determining of the validating plane for the first control message comprises selecting both a data plane and a control plane of the switch to perform the validating.

18. The non-transitory computer-readable storage medium of claim 16, wherein the subset of inactive parameters are treated as wildcard values.

19. A switch comprising:
a processor;
a non-transitory storage medium storing instructions executable on the processor to:
receive a first control message and a second control message from an operations, administration, and management (OAM) platform, wherein a respective control message of the first and second control messages comprises a type-length-value (TLV) data structure, wherein the TLV data structure includes TLV-encoded data;
based on identifying, in the first control message from the OAM platform, a first TLV data structure associated with validation:
determine a validating plane of the switch for the first control message based on a value of the first TLV data structure; and
validate the first control message at the validating plane; and
based on identifying, in the second control message from the OAM platform, a second TLV data structure comprising a plurality of fields, wherein the plurality of fields include parameter fields containing a plurality of parameters corresponding to a request in the second control message:
determine, based on information in a further field of the plurality of fields in the second TLV data structure, a subset of active parameters from the plurality of parameters, wherein the information in the further field in the second TLV data structure comprises a first indicator identifying a first parameter of the plurality of parameters as active, and a second indicator identifying a second parameter of the plurality of parameters as inactive, the first parameter being part of the subset of active parameters; and process the request in the second control message based on the subset of active parameters, wherein the request in the second control message includes a validation request for the plurality of parameters, and wherein processing the request comprises generating, for the OAM platform, a response indicating a validation of the subset of active parameters.

* * * * *